(12) United States Patent
Ottosson

(10) Patent No.: US 9,429,109 B2
(45) Date of Patent: Aug. 30, 2016

(54) CARBURETOR ASSEMBLY

(71) Applicant: HUSQVARNA AB, Huskvarna (SE)

(72) Inventor: Magnus Ottosson, Norrahammar (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/902,610

(22) PCT Filed: Jul. 4, 2013

(86) PCT No.: PCT/SE2013/050865
§ 371 (c)(1),
(2) Date: Jan. 4, 2016

(87) PCT Pub. No.: WO2015/002587
PCT Pub. Date: Jan. 8, 2015

(65) Prior Publication Data
US 2016/0177877 A1    Jun. 23, 2016

(51) Int. Cl.
F02M 23/03    (2006.01)
F02B 75/02    (2006.01)
F02B 23/10    (2006.01)

(52) U.S. Cl.
CPC .............. *F02M 23/03* (2013.01); *F02B 23/10* (2013.01); *F02B 75/02* (2013.01)

(58) Field of Classification Search
CPC ............................... F02M 23/03; F02B 23/10
USPC .............. 261/38, 42, 23.2, 23.3, 52, DIG. 1; 123/73 PP
See application file for complete search history.

(56) References Cited

U.S. PATENT DOCUMENTS 6,708,958 B1    3/2004    Warfel et al.
6,896,245 B2    5/2005    Suzuki et al.

(Continued)

FOREIGN PATENT DOCUMENTS

EP    1559899 A2    8/2005
JP    2005180188 A    7/2005

OTHER PUBLICATIONS

International Search Report and Written Opinion of PCT/SE2013/050865 mailed Mar. 14, 2014, all enclosed pages cited.

(Continued)

*Primary Examiner* — Robert A Hopkins
(74) *Attorney, Agent, or Firm* — Nelson Mullins Riley & Scarborough LLP

(57) ABSTRACT

The invention relates to a carburetor assembly (10) for a two-stroke internal combustion engine, the assembly comprising a main intake passage (12) accommodating a throttle valve (30), an additional air passage (14) accommodating an additional air valve (50), a pivotable air valve lever (55) turning together with the air valve (50), and an interlock lever (35) turning together with the throttle valve (30). The interlock lever (35) is configured to be settable in an interlocked pivotal position, in which the throttle valve (30) is open to a certain degree in order to provide a start gas position of the throttle valve (30), wherein the interlock is arranged to be released if the interlock lever (35) is pivoted further in the opening direction of the throttle valve (30). The assembly further comprising a pivotable trigger lever (45) responsive to e.g. pulling of a throttle trigger and being operatively connected to the air valve lever (55). The pivotable trigger lever (45) is operatively connectable to the interlock lever (35) or a member that moves with the interlock lever (35) via an abutting engagement at predetermined relative positions of the trigger lever (45) and the interlock lever (35). Further, the trigger lever (45) is arranged to permit the interlock lever (35) to pivot away from the abutting engagement in the opening direction of the throttle valve (30) at least to an offset angle ( ) relative to the trigger lever (45), such that the interlocked lever (35) can be set in the interlocked position without affecting the pivotal position of the trigger lever (45).

12 Claims, 3 Drawing Sheets

(56) References Cited

U.S. PATENT DOCUMENTS

| | | |
|---|---|---|
| 6,928,996 B2 | 8/2005 | Tobinai |
| 7,104,253 B1 | 9/2006 | Dow et al. |
| 7,377,496 B2 | 5/2008 | Toda et al. |
| 7,429,033 B2 * | 9/2008 | Seki ........................ F02B 25/22 123/73 PP |
| 7,503,292 B2 | 3/2009 | Holmdahl |
| 8,453,998 B2 | 6/2013 | Pattullo et al. |

OTHER PUBLICATIONS

Chapter I International Preliminary Report on Patentability of PCT/SE2013/050865 mailed Jan. 5, 2016, all enclosed pages cited.

* cited by examiner

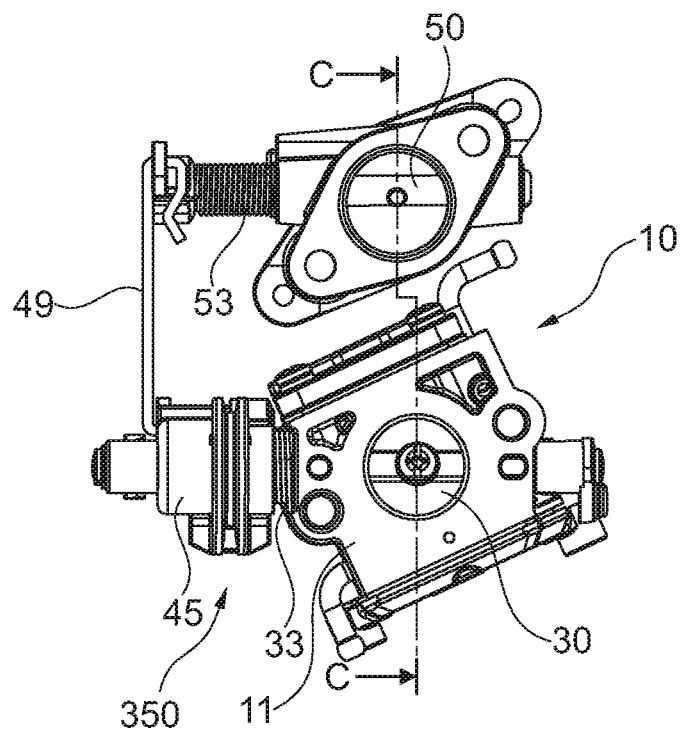
Fig. 7
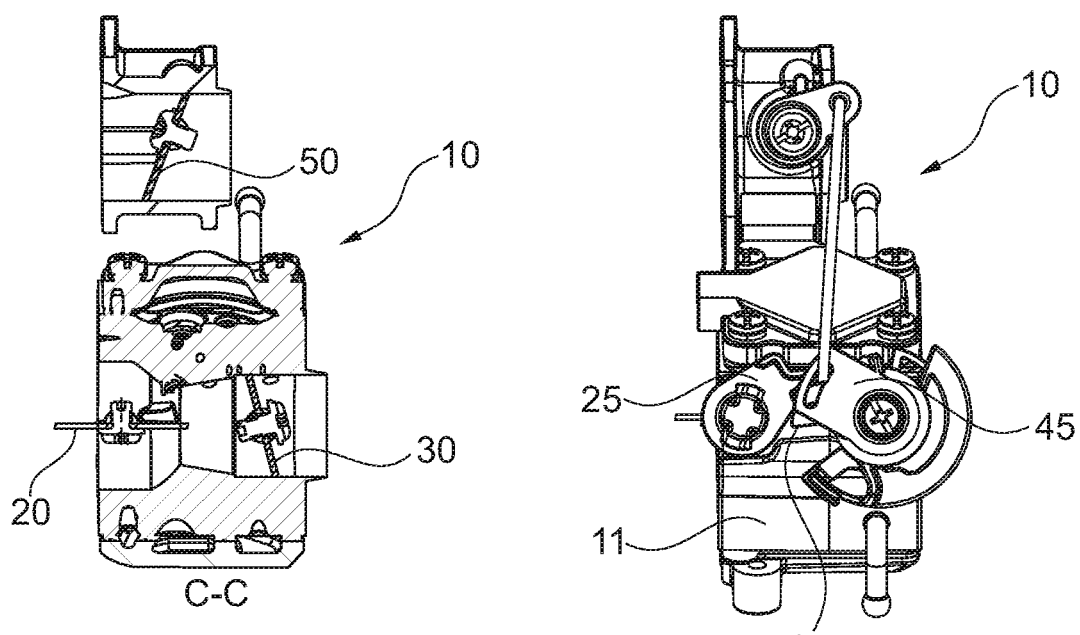
Fig. 8
Fig. 9

CARBURETOR ASSEMBLY

TECHNICAL FIELD

The invention relates to a carburetor assembly for a two-stroke internal combustion engine, comprising a main intake passage accommodating a throttle valve, an additional air passage accommodating an additional air valve, a pivotable air valve lever turning together with the air valve, an interlock lever turning with the throttle valve. More specifically to carburetors where the interlock lever is configured to be settable in an interlocked pivotal position, in which the throttle valve is open to a certain degree in order to provide a start gas position of the throttle valve, and where the interlock is arranged to be released if the interlock lever is pivoted further in the opening direction of the throttle valve.

BACKGROUND OF THE INVENTION

Two-stroke combustion engines using the additional air during the scavenging are previously known in the art. These engines reduce fuel consumption and exhaust emissions.

The flow rate of scavenging air and the air/fuel mixture is typically proportional. An air valve is therefore provided to the air channel for supplying scavenging air to the engine. The air valve is operated in coordination with the throttle valve of the carburetor. The air valve and the throttle valve are commonly connected by a link mechanism, such as e.g. disclosed in U.S. Pat. No. 6,328,288 (FIGS. 3 and 4) and U.S. Pat. No. 7,503,292, or by engaging levers such as e.g. disclosed in U.S. Pat. No. 6,328,288 (FIG. 5) and U.S. Pat. No. 7,377,496. The connection between the throttle valve and the air valve can be a lost motion coupling allowing an opening range of the throttle valve in which the air valve does not open.

When the carburetor is provided with a choke valve, a cold start-up is performed by having the choke valve closed and the throttle valve is slightly opened. At this time, the air valve must be closed.

In U.S. Pat. No. 7,503,292 the opening state of the air valve is delimited by a choked state of said choke valve regardless of the throttle valve opening state by interaction with an air valve lever air valve axle and a choke valve lever of the choke valve axle.

U.S. Pat. No. 7,377,496, U.S. Pat. No. 6,928,996, U.S. Pat. No. 7,104,253 are other examples of carburetors sing scavenging air.

OBJECTS OF THE INVENTION it is an object of the invention to provide a carburetor assembly which can be more easily adapted to different designs of two-stroke internal combustion engines using additional air. Another object is to provide a carburetor assembly that facilitates cold starting of the engine.

SUMMARY OF THE INVENTION

These objects are to at least some extent met by the carburetor assembly mentioned initially where a pivotable trigger lever is operatively connected to the air valve lever, and also operatively connectable to the interlock lever or a member that moves with the interlock lever via an abutting engagement at predetermined relative position of the trigger lever and the interlock lever, and the trigger lever is arranged to permit the interlock lever to pivot away from the abutting engagement in the opening direction of the throttle valve at least to an offset angle α relative to the trigger lever, such that the interlocked lever can be set in the interlocked position without affecting the pivotal position of the trigger lever.

Thereby, the throttle valve can be set in the start gas position without affecting the position of the air valve lever, even though the throttle valve is set in a position passed the position of the throttle valve for which the opening of the air valve is actuated during normal run (i.e. not in the cold start mode). This enables a comparatively large start gas opening degree of the throttle valve even though the air valve is closed or almost closed which considerably facilitates cold starting of the two-stroke internal combustion engine.

Moreover, a solution is provided that enables smaller changes to the carburetor assembly while adapting it for different engine designs, as the start gas position of the throttle valve can be optimized independently of the position of the air valve.

Preferably, the main intake passage further accommodates a choke valve, and a pivotable choke valve lever is configured to have at least one state in which it turns together with the choke valve. The interlock pivotal position is preferably provided by an engagement between the interlock lever and the choke valve lever.

Preferably the choke valve lever is rigidly connected to the choke valve and being biased by a choke valve return spring towards an open position of the choke valve.

Preferably a throttle valve return spring biases the interlock lever towards a closed position of the throttle valve and towards the abutting engagement.

In one embodiment a torsion spring urges the trigger lever away from the abutting engagement with the interlock lever or the member that moves with the interlock lever, the torsion spring being weaker than the throttle valve return spring.

Preferably, the trigger lever is operatively connected to the air valve lever via a lost motion coupling providing a delayed pivoting of the air valve lever upon pivoting of the trigger lever.

Preferably the choke valve lever, the interlock lever, the throttle trigger and the air valve lever are located on the same lateral side of the carburetor assembly. Thereby the width of the carburetor assembly can be reduced.

Preferably, the abutting engagement is between the trigger lever and the interlock lever.

Preferably, the trigger lever is arranged to permit the interlock lever to pivot away from the abutting engagement in the opening direction of the throttle valve to the offset angle α relative to the trigger lever, wherein the offset angle α is in the range of 1-40°, preferably 2-20', more preferably 5-15°.

The invention also relates to a hand held power tool including an engine with a carburetor assembly according to any one of the preceding claims, said power tool including a throttle trigger operatively connected to the trigger lever of the carburetor assembly and a choke button operatively connected to the choke valve.

BRIEF DESCRIPTION OF THE DRAWINGS

FIGS. 7-9 show a carburetor assembly in which the choke valve is open and the throttle valve is closed, i.e. an idling position.

DESCRIPTION OF THE INVENTION

Figure 1:
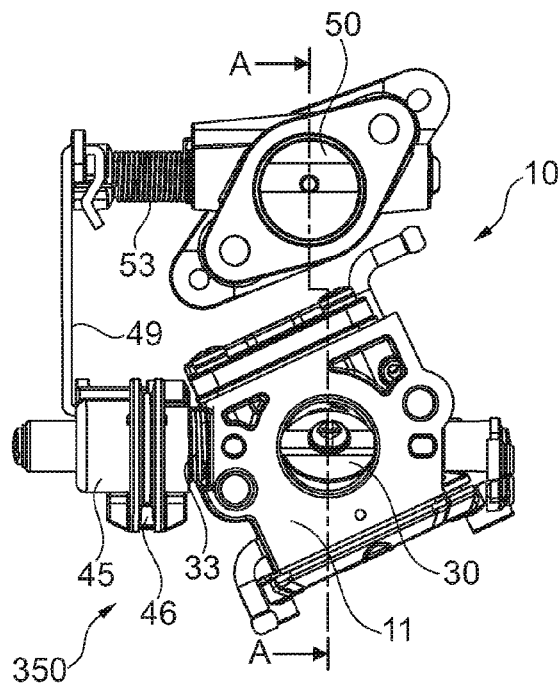
FIGS. 1-3 show a carburetor assembly set a start gas position.
Figure 2:
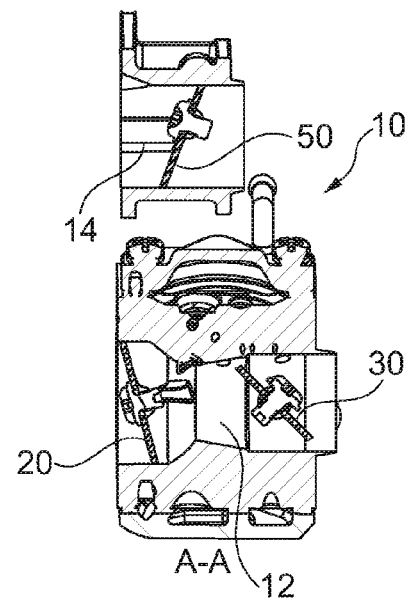
Figure 3:
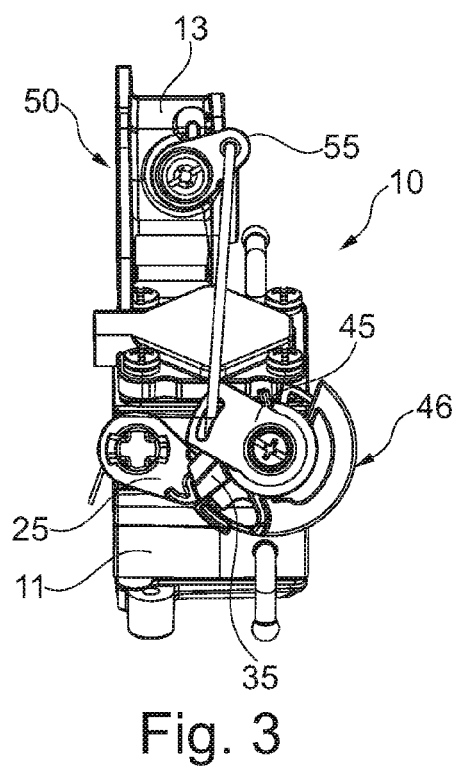

The invention concerns a carburetor of a two stroke internal combustion engine that operates with scavenging air. The internal combustion engine is a two-cycle engine that operates with layered scavenging and is preferably used in manually guided implements. Such manually guided, portable implements can be embodied as power chainsaws, cut-off machines, brush cutters, blowers or the like.

FIG. 1-9 shows a carburetor assembly 10 including a main body 11 having a main intake passage 2 extending from an air intake side of the main body 11 towards an opposite engine side of the main body 11. The main intake passage 12 accommodates a pivotable choke valve 20 and a pivotable throttle valve 30. The choke valve 20 is accommodated at the air intake side and the throttle valve 30 is accommodated downstream the choke valve at the engine side.

The carburetor assembly 10 further includes a scavenging air component 13 that has an air passage 14 running essentially parallel to the main intake passage 12. The air passage 14 accommodates a pivotable air valve 50. An air valve lever 55 turns with the air valve 50 and is mounted at one side of the scavenging air component 13. The opening and closing of the air valve 50 is controlled by the pivotal movement of the additional air valve lever 55. An air valve return spring 53, preferably a torsion spring, has one end secured to the scavenging air component 13 and the other end to the air valve lever 55 biasing the air valve 50 towards a closed position.

A choke valve lever 25 at least partly follows the opening and closing of the choke valve 20. In the shown embodiment the choke valve lever 25 is rigidly mounted to the choke valve axle 21 such that they always turn jointly with each other. A choke valve return spring 23, preferably a torsion spring, has one end secured to the main body 11 and the opposite end to the choke valve lever 25 biasing the choke valve 20 towards an open position.

A throttle valve controlling mechanism 350 controls the throttle valve 30. The throttle valve controlling mechanism 350 comprises a throttle interlock lever 35 mounted to the throttle valve axle 31 and a coaxially mounted trigger lever 45. The throttle interlock lever 35 is rigidly mounted to the throttle valve axle 31 such that they turn jointly with each other. A throttle valve return spring 33, preferably a torsion spring, has one end secured to the main body 11 and the opposite end to the throttle interlock lever 35 biasing the throttle valve 30 towards a closed position.

In FIG. 1-5 the choke valve lever 25 and the interlock lever 35 are set in an interlocked position 60 in which the throttle valve 30 is open to a certain degree to provide a start gas position of the throttle valve 30. In the shown embodiment the choke valve 20 is closed when the choke lever 25 is in the interlocked position. The interlocked position 60 is enabled by turning the choke valve axle 21 from an open position of the choke valve 20 (see FIG. 7-9) to a closed position (i.e. pivoting the choke valve lever 25 clockwise from the position of FIG. 9 to the position of FIG. 3). When turning the choke valve axle 21 towards the closed position the choke valve lever 25 engages the throttle interlock lever 35 pivoting it towards a partially open state of the throttle valve 30. Upon reaching the closed position of the choke valve 20 the throttle interlock lever 35 is snapped by the throttle valve return spring 33 into a recess of the choke valve lever 25 in which both levers restricts each other from pivoting back. Since both return springs 23, 33 urge the levers to pivot back, an interlocked position 60 is provided. The interlock 60 is released by pivoting the throttle interlock lever 35 further in the opening direction of the throttle valve 30 so that the interlock lever 35 exits the recess whereby the choke lever 25 is returned back to open position by the choke valve return spring 23.

The trigger lever 45 is loosely mounted around the throttle valve axle 31 such that it can pivot in relation to the throttle valve axle 31 without directly affecting it. The trigger lever 45 includes a guide channel 46 and knot cavity 47 for receiving and guiding a throttle wire (not shown) and retaining it. The throttle wire (not shown) is connected to a throttle actuator (not shown) of a hand held power tool (not shown) in manner known per se. I.e. actuating the throttle actuator conveys a pulling action to the throttle wire. The trigger lever 45 is operatively connected to the air valve lever 55 by a link rod 49 that is loosely secured in an oblong hole 48 of the trigger lever 45. This provides a lost motion coupling between the trigger lever 45 and the air valve lever 55. I.e., when starting from idle (zero throttle) and turning the trigger lever 45 in the opening direction of the throttle valve by actuating the throttle actuator, the trigger lever 45 is rotated a certain degree before the air valve lever 55 starts to rotate, thereby a delayed opening of the air valve 50 is enabled.

Figure 4:
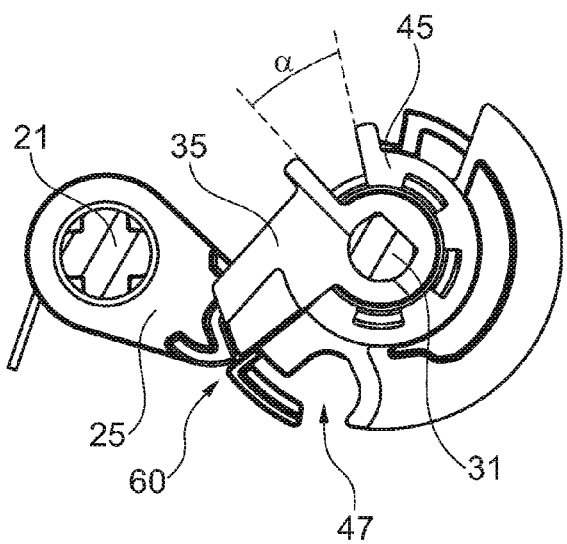
FIG. 4 shows schematically how levers of the carburetor of FIG. 3 interact in the start gas position.
Figure 5:
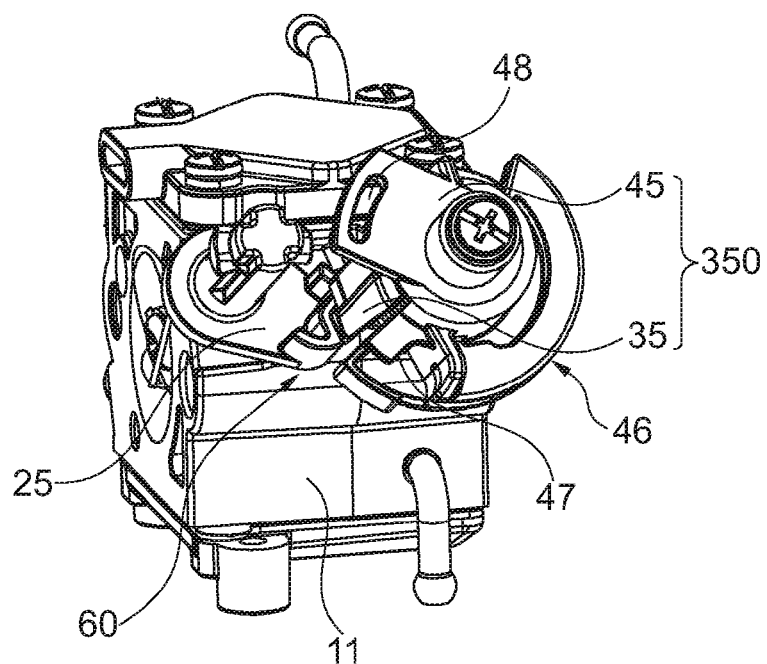
FIG. 5 shows perspective view of the carburetor main body of FIG. 1-3.
Figure 6:
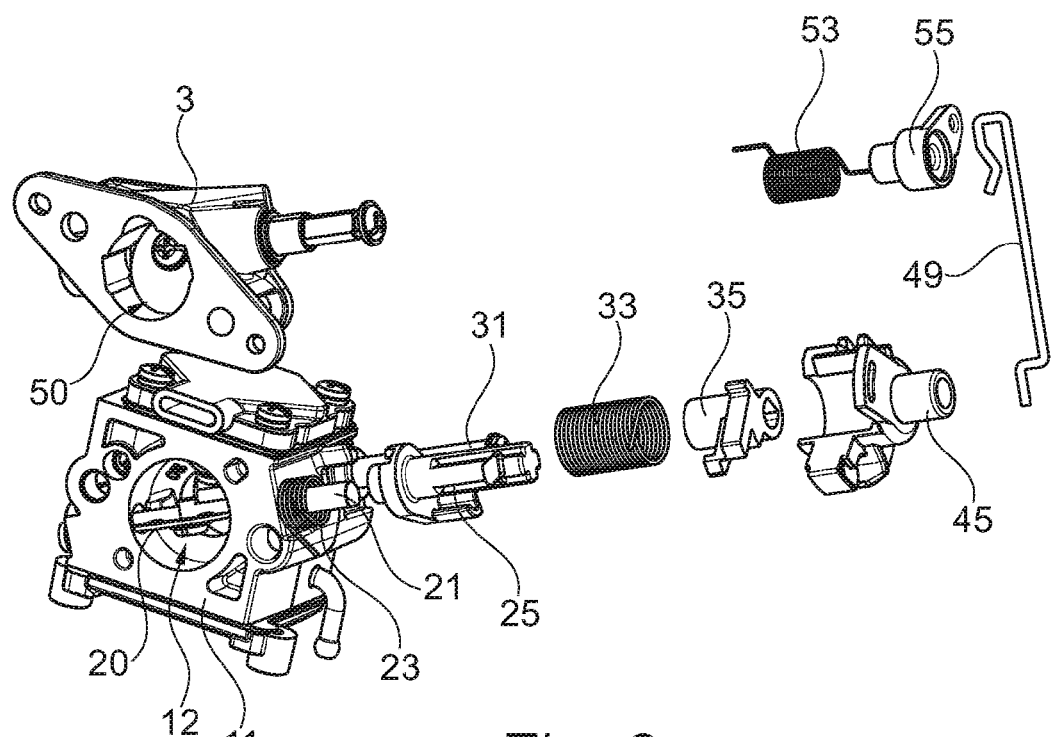
FIG. 6 is an exploded view of a carburetor assembly.

During normal operation, such as for part- and full throttle positions of the trigger lever 45, the trigger lever 45 is in abutting engagement ($\alpha=0$) with the interlock lever 35. The abutting engagement is in a predetermined relative position between the levers 35, 45. In this situation the throttle valve return spring 33 urges the interlock lever 35 towards the trigger lever 45. When actuating the trigger lever 45 it will therefore turn jointly with the interlock lever 35 and consequently with the throttle axle 31 and thus functioning as if the trigger lever 45 and the interlock lever 35 were a single lever. When the interlock lever 35 is set in the interlocked position 60 by pivoting the choke valve lever 25, the interlock lever 35 is offset from abutting engagement with the trigger lever 45 (as long as it is not deliberately actuated). This is best seen in FIG. 4 where the offset angle $\alpha$ is shown. In this position the air valve 50 is closed by the air valve returning spring 53 and the trigger lever 45 is restrained by the link rod 49. By actuating the trigger lever 45, the trigger lever 45 will pivot to the abutting engagement ($\alpha=0$) and upon further actuation in the opening direction the trigger lever 45 and the interlock lever 35 turn jointly releasing the interlock 60 and thus returning to normal operation. At the same time the lost motion delay of the air valve 50 can be optimized for normal operation regardless of degree of opening of the throttle valve 30 at start gas.

The offset angle $\alpha$, which corresponds to the start gas position, is suitably in the range of 1-40°, preferably 2-20°, more preferably 5-15°.

The following modifications are also included within the scope of the invention:

For example, a trigger lever torsion spring (not shown) may be arranged between the trigger lever 45 and the interlock lever 35 to cushioning the abutting engagement and biasing the trigger lever 45 away from the interlock lever 35 when it is in the interlocked position. The trigger lever torsion spring being a weaker spring than the throttle valve return spring 33, so that the throttle valve return spring 33 overcomes the spring force of the trigger lever torsion spring during normal operation.

Furthermore, the coupling between the trigger lever 35 and the air valve lever 55 can be of other types than the one described above. For instance by having engaging levers as described in U.S. Pat. No. 7,377,496 or a flexible cord as disclosed in U.S. Pat. No. 7,104,253.

In an alternative embodiment the choke valve lever 25 is free to rotate in relation the choke valve axle 20 and having detent hook that grasps a choke valve conveyor fixed to the choke valve axle, as described in relation to FIG. 7-10 in US2008/0246170. In this embodiment the throttle valve can be engaged in the interlocked position while the choke valve opening can be varied by turning the choke valve conveyor away from the detent position.

The trigger lever 45 may alternatively abut a member separate from the interlock lever 35 that is rigidly secured to the throttle valve axle 31 thereby turning with the throttle valve 30. For instance the trigger lever 45 and the member turning with the throttle valve may be mounted at the one lateral side of the carburetor body 11 and the interlock lever 35 and the choke valve lever 25 may be mounted at the opposite lateral side.

Whereas the invention has been shown and described in connection with the preferred embodiments thereof it will be understood that many modifications, substitutions, and additions may be made which are within the intended broad scope of the following claims.

The invention claimed is:

1. A carburetor assembly for a two-stroke internal combustion engine, comprising:
   a main intake passage accommodating a throttle valve;
   an additional air passage accommodating an additional air valve;
   a pivotable air valve lever turning together with the air valve; and
   an interlock lever turning together with the throttle valve, the interlock lever being configured to be settable in an interlocked pivotal position, in which the throttle valve is open to a certain degree in order to provide a start gas position of the throttle valve, said interlock arranged to be released if the interlock lever is pivoted further in the opening direction of the throttle valve; and
   a pivotable trigger lever responsive to pulling of a throttle trigger and being operatively connected to the air valve lever;
   wherein the trigger lever being operatively connectable to the interlock lever or a member that moves with the interlock lever via an abutting engagement at predetermined relative positions of the trigger lever and the interlock lever; and
   wherein the trigger lever is arranged to permit the interlock lever to pivot away from the abutting engagement in the opening direction of the throttle valve at least to an offset angle relative to the trigger lever, such that the interlocked lever can be set in the interlocked position without affecting the pivotal position of the trigger lever.

2. The carburetor assembly according to claim 1 wherein the main intake passage further accommodates a choke valve, wherein a pivotable choke valve lever is configured to have at least one state in which the pivotable choke valve lever turns together with the choke valve.

3. The carburetor assembly according to claim 2 wherein the interlocked pivotal position is provided by an engagement between the choke valve lever and the interlock lever.

4. The carburetor assembly according to claim 3 wherein the choke valve lever is rigidly connected to the choke valve and wherein a choke valve return spring biases the choke valve lever towards an open position of the choke valve.

5. The carburetor assembly according to claim 1 wherein a throttle valve return spring biases the interlock lever towards a closed position of the throttle valve and towards the abutting engagement.

6. The carburetor assembly according to claim 1 wherein a torsion spring urges the trigger lever away from abutting engagement with the interlock lever or the member that moves with the interlock lever, the torsion spring being weaker than the throttle valve return spring.

7. The carburetor assembly according to claim 1 wherein the trigger lever is operatively connected to the air valve lever via a lost motion coupling providing a delayed pivoting of the air valve lever upon pivoting of the trigger lever.

8. The carburetor assembly according to claim 2 wherein the choke valve lever, the interlock lever, the trigger lever and the air valve lever are located on the same lateral side of the carburetor assembly.

9. The carburetor assembly according to claim 1 wherein the abutting engagement is between the trigger lever and the interlock lever.

10. The carburetor assembly according to claim 1 wherein the trigger lever is arranged to permit the interlock lever to pivot away from the abutting engagement in the opening direction of the throttle valve to the offset angle relative to the trigger lever, wherein the offset angle is in the range of 1-40°.

11. The carburetor assembly according to claim 1 wherein the pivotable trigger lever is coaxially mounted with the interlock lever.

12. A hand held power tool including an engine with a carburetor assembly, said power tool including a throttle trigger operatively connected to a pivotable trigger lever of the carburetor assembly, the carburetor assembly comprising:
    a main intake passage accommodating a throttle valve;
    an additional air passage accommodating an additional air valve;
    a pivotable air valve lever turning together with the air valve; and
    an interlock lever turning together with the throttle valve, the lever being configured to be settable in an interlocked pivotal position, in which the throttle valve is open to a certain degree in order to provide a start gas position of the throttle valve, said interlock arranged to be released if the interlock lever is pivoted further in the opening direction of the throttle valve; and
    the trigger lever being responsive to pulling of the throttle trigger and being operatively connected to the air valve lever;
    wherein the trigger lever is operatively connectable to the interlock lever or a member that moves with the interlock lever via an abutting engagement at predetermined relative positions of the trigger lever and the interlock lever; and
    wherein the trigger lever is arranged to permit the interlock lever to pivot away from the abutting engagement in the opening direction of the throttle valve at least to an offset angle relative to the trigger lever, such that the interlocked lever can be set in the interlocked position without affecting the pivotal position of the trigger lever.

* * * * *